(12) United States Patent  
Gallagher (10) Patent No.: US 8,539,160 B2
(45) Date of Patent: Sep. 17, 2013

(54) ASYNCHRONOUS CACHE REFRESH FOR SYSTEMS WITH A HEAVY LOAD

(75) Inventor: Stephen J. Gallagher, Methuen, MA (US)

(73) Assignee: Red Hat, Inc., Raleigh, NC (US)

( * ) Notice: Subject to any disclaimer, the term of this patent is extended or adjusted under 35 U.S.C. 154(b) by 715 days.

(21) Appl. No.: 12/556,887

(22) Filed: Sep. 10, 2009

(65) Prior Publication Data

US 2011/0060881 A1    Mar. 10, 2011

(51) Int. Cl.
*G06F 12/00*    (2006.01)

(52) U.S. Cl.
USPC .................. 711/133; 711/118; 711/E12.016

(58) Field of Classification Search
USPC .................................. 711/133, 118, E12.016
See application file for complete search history.

(56) References Cited

U.S. PATENT DOCUMENTS

| 5,479,642 | A | * | 12/1995 | Jarvis | 711/144 |
| 5,931,904 | A | * | 8/1999 | Banga et al. | 709/217 |
| 2002/0187749 | A1 | * | 12/2002 | Beasley et al. | 455/41 |
| 2004/0068579 | A1 | * | 4/2004 | Marmigere et al. | 709/242 |
| 2004/0073707 | A1 | * | 4/2004 | Dillon | 709/245 |
| 2004/0255016 | A1 | * | 12/2004 | Hundscheidt et al. | 709/223 |
| 2007/0206621 | A1 | * | 9/2007 | Plamondon et al. | 370/413 |
| 2008/0040395 | A1 | * | 2/2008 | Danoyan | 707/200 |
| 2008/0147311 | A1 | * | 6/2008 | Zoller et al. | 701/201 |

* cited by examiner

*Primary Examiner* — Larry Mackall
(74) *Attorney, Agent, or Firm* — Lowenstein Sandler LLP (57) ABSTRACT

A method and system to refresh a data entry in a cache before the data entry expires. The system includes a client computing system coupled to a server via a network connection. In response to a request for data access, the client computing system locates a data entry in a cache and determines whether the data entry in the cache has exceeded a refresh timeout since a last update of the data entry. If the data entry in the cache has exceeded the refresh timeout, the client computing system retrieves the data entry found in the cache in response to the request without waiting for the data entry to be refreshed, and requests a refresh of the data entry from the server via the network connection.

17 Claims, 5 Drawing Sheets

ASYNCHRONOUS CACHE REFRESH FOR SYSTEMS WITH A HEAVY LOAD

TECHNICAL FIELD

Embodiments of the present invention relate to cache management in a client-server environment, and more specifically, to the determination of when to update a local cache at the client side in a client-server environment.

BACKGROUND

In a client-server environment, the client sometimes stores a local copy of the data that was retrieved from the server. For example, a Web client may store a local copy of a document that was retrieved from a central Web server. If access to the data takes place repeatedly over a short period of time, storing a copy of the data in local storage can reduce the data access time. The local storage is sometimes referred to as a cache. Caches generally are faster storage devices when compared with a centralized main storage device that is connected to a server.

Conventionally, when a client receives a request for a data entry, the client checks its cache first. If the requested entry exists in the cache and that entry is not too old, the entry is retrieved from the cache. If the entry does not exist in the cache, or the cache entry is too old, the client will go to the slower backing data store to request a cache update. The client will populate the cache and then return the newly updated result to the requester of the data entry. Waiting for a cached update from the slower back-end data store (e.g., a centralized main storage) can be time-consuming, especially for systems with a heavy load. As a result, the overall efficiency of the system can be reduced.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for refreshing a data entry in a cache before the data entry expires. In one embodiment, the system includes a client machine coupled to a server via a network connection. In response to a request for data access, the client machine locates a data entry in a cache and determines whether the data entry in the cache has exceeded a refresh timeout since a last update of the data entry. If the data entry in the cache has exceeded the refresh timeout, the client machine retrieves the data entry found in the cache in response to the request without waiting for the data entry to be refreshed, and requests a refresh of the data entry from the server via the network connection.

In one embodiment, the refresh timeout is a timeout value less than an expiration timeout. If a cached data entry has not been updated (also referred to as "refreshed") for a time period greater than an expiration timeout value, then the data entry is deemed too old and needs to be refreshed before it can be returned to a requester of the data entry. The refresh timeout addresses the case where requests are coming in at high rates. If a request for an entry comes in and the elapsed time of the entry since its last update is less than the refresh timeout, then the cached data entry is returned as normal. If the elapsed time of the entry since its last update is greater than the refresh timeout but less than the expiration timeout, then the cached data entry is returned immediately and an asynchronous cache update is scheduled. The asynchronous update refreshes the cache out-of-band in order to extend the timeout for the cache. With the asynchronous cache update, a client would not be caught waiting for a slow cache refresh of a data entry that is requested at a high rate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
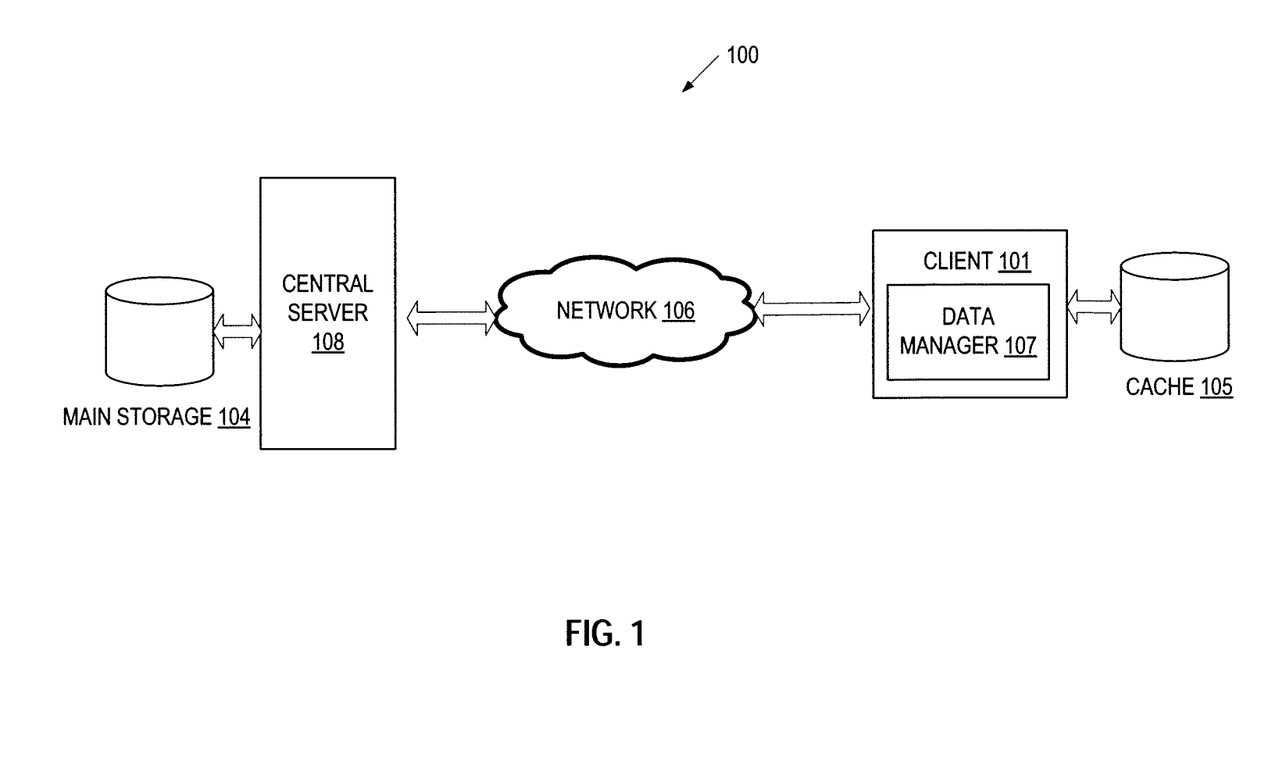
FIG. 1 is a block diagram of an exemplary architecture in which embodiments of the invention may be implemented.

FIG. 1 illustrates an exemplary network architecture 100 in which embodiments of the present invention may operate. The network architecture 100 may include a client machine ("client computing system" or "client") 101 and a central server ("server") 108 coupled to a network 106. The client 101 may be a computing system, for example, workstations, personal computers (PCs), mobile phones, palm-sized computing devices, personal digital assistants (PDAs), etc. In one embodiment, the client 101 can serve as a server to other devices as a data provider or a service provider. For example, the server 108 may be a Lightweight Directory Access Protocol (LDAP) server and the client 101 may be a Web server. Thus, it is understood that the terms "server" and "client" are used herein in a relative sense. The client 101 is coupled to the server 108 via the network 106, which may be a public network (e.g., Internet) or a private network (e.g., Ethernet or a local area Network (LAN)). Any number of clients 101 may exist in the network architecture 100.

The server 108 may reside on one or more server machines. In one embodiment, the server 108 serves as a data provider to receive data requests from a requesting client 101, to retrieve data from main storage 104 (also referred to as a "back-end data store") in response to the data requests, and to send the data to the client 101. After receiving the data, the requesting client 101 stores a copy of the data in a cache 105 that is associated with and locally coupled (via a network or a direct connection) to the requesting client 101. The client 101 can access data in its associated cache 105 much faster than it can access the main storage 104 via the server 108. In one embodiment, the main storage 104 and cache 105 may comprise mass storage devices, such as magnetic or optical storage based disks, tapes or hard drives.

According to one embodiment of the present invention, the client 101 includes a data manager 107 that manages data retrieval and cache refresh. An embodiment of the data manager 107 will be described in greater detail with reference to FIG. 2.

The cache refresh approach described herein can be useful in a system that has a heavy load with respect to data access. For example, the server 108 can be an LDAP server that contains a list of all of the users in a corporate environment.

The client 101 can be a Web server that accepts requests from the Internet where people can log in using their user identities provided by the LDAP server. Accessing the LDAP server for every user request is very slow; e.g., in the order of seconds. For a Web server, there may be 30, 40, or even 50 requests for the same user every second as the Web server authenticates every item on a web page. If there is a large number of repeated requests for the same user, the cache locally coupled to the Web server can be continuously updated. Conventionally, a cache is updated when a cached entry is expired. A user requesting the expired entry would need to wait for a few seconds for the entry to be updated. After the updated entry expires, another user requesting the same entry would need to wait for another few seconds for the entry to be updated again. The cache refresh approach described herein keeps a rolling update of the cache, such that all of the authentication requests (or other data access requests) can go through immediately.

It is understood that the central server 108 can be any data provider of any type. For example, the server 108 can be LDAP, NIS, NIS+, etc, for managing user data (e.g., user identity information) stored in the main storage 104. Alternatively, the server 108 can be an SQL database server that manages generic data entries. In some scenarios, the data entries can be used to determine login permission on a local client machine 101, or to provide a list of users permitted to access a particular application on a system.

Figure 2:
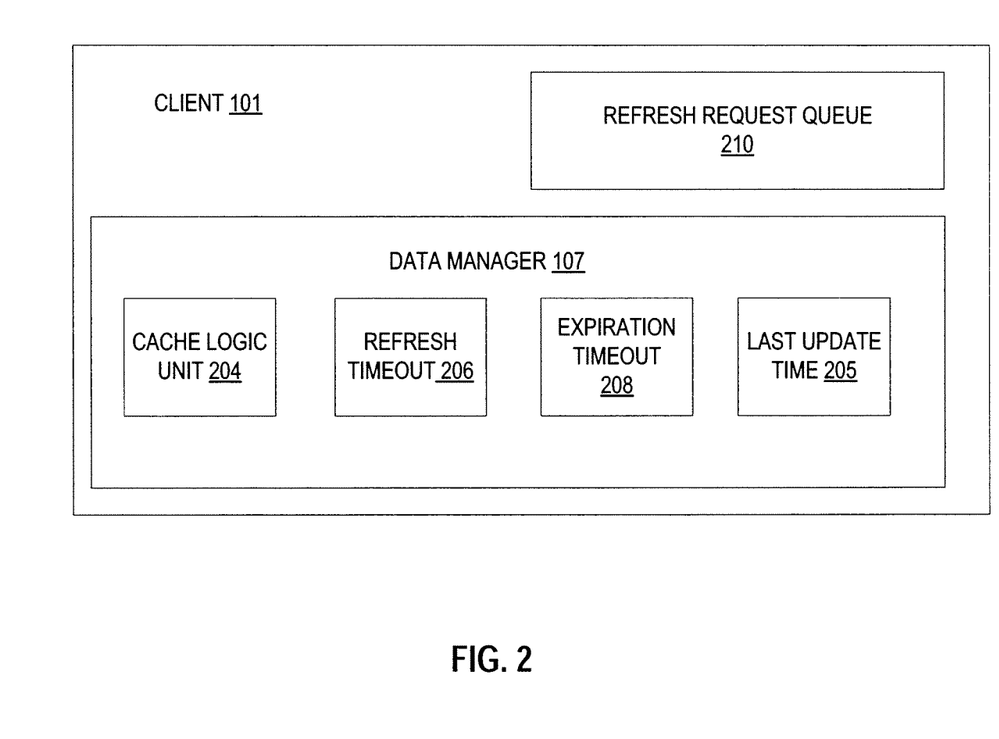
FIG. 2 is a block diagram of one embodiment of a data manager in a client machine.

FIG. 2 is a block diagram of one embodiment of the data manager 107 in the client 101. The data manager 107 includes a cache logic unit 204 that determines whether a data entry is to be retrieved from the main storage 104 or from the cache 106, and when a cached data entry is to be refreshed. In one embodiment, the cache logic unit 204 maintains a last update time 205 for each cached data entry, which keeps track of the elapsed time since the last update of the entry. The terms "update" and "refresh" are herein used interchangeably. Based on the last update time 205, the cache logic unit 204 determines whether a cached data entry is expired. A cached data entry is expired if the entry has not been refreshed for a time period that exceeds an expiration timeout 208; that is, the last update time 205 of the cached data entry has exceeded the expiration timeout 208. Also, in the case of an initial retrieval (i.e. if this is the first time a request has been made for this entry), the entry will not exist in the cache. When an expired data entry or an initial retrieval of a data entry is requested, a cache miss occurs. A cache miss incurs the slowest response, which necessitates a real-time cache refresh before a reply can be sent to a requester of the data entry.

The cache logic unit 204 can also determine whether a cached data entry is expiring. A cached data entry is expiring if the entry in the cache has not been updated for a time period that exceeds a refresh timeout 206. That is, the last update time 205 of the cached data entry has exceeded a refresh timeout 206 but has not exceeded the expiration timeout 208. The refresh timeout 206 is less than the expiration timeout 208; e.g., the refresh timeout 206 can be one-half, two-thirds or other fractional amount of the expiration timeout 208. In one embodiment, different categories of data entries may have different life spans, as represented by their corresponding refresh timeout values and expiration timeout values. For example, the refresh timeout and/or expiration timeout for data entries containing group identities can be configured to different values from the refresh timeout and/or expiration timeout for data entries containing individual user identities.

The use of the refresh timeout 206 enables an asynchronous cache update to reduce the number of cache misses. A requester of the data entry will receive the cached copy immediately and the cache refresh will occur out-of-band (e.g. in a parallel process so as not to impede other requests). The out-of-band cache refresh does not block any other request while the cache is being refreshed.

In one embodiment, the expiration timeout 208 can be configured such that the difference between the expiration timeout 208 and the refresh timeout 206 is large enough to account for the completion of an out-of-band cache refresh request. Having a large difference between the refresh timeout and the expiration timeout is for performance tuning; however, there is no requirement that the difference meet or exceed the lookup time. An example in which the difference does not exceed the lookup time is provided below. Assume that the cache refresh timeout is 25 seconds and a cache expiration timeout is 30 seconds. Now assume that lookup requests take 10 seconds (for illustrative purposes). A request comes in at 26 seconds since the previous update. This returns a response from the cache immediately, but triggers an out-of-band update. Then another request is received five seconds later (at 31 seconds since the previous completed update). This is a cache miss and a result cannot be returned until the cache is refreshed. However, since the out-of-band update is already running, the second request waits only 5 seconds (which is the remaining time on the out-of-band lookup) instead of the full 10 seconds.

In one embodiment, the client 101 includes a refresh request queue 210 to queue the refresh requests waiting to be sent to the server 108. A scheduler in the client 101 can be used to schedule the delivery of the refresh request to the server 108. Each time an out-of-band refresh request is generated, the request is added to the queue 210. The use of the queue allows the cache 105 to be refreshed asynchronously with the user requests. The queuing of the cache refresh requests can be completely transparent to the client. That is, the client does not need to have knowledge of the asynchronous cache updates. It is worth noting that the requests for the same data will be queued only once. The queued request can have necessary information attached to it to indicate which requesting applications need this data. Therefore, if three separate applications all request a cache update within a second of each other, only one call to the data provider (e.g., server 108) will be invoked. When the result (i.e., updated data) is ready, all three applications will be signaled. The queuing of only one request for the same data can reduce the wait time for subsequent requests, as described in the above example where the difference between the refresh timeout and the expiration timeout does not exceed the lookup time.

Figure 3:
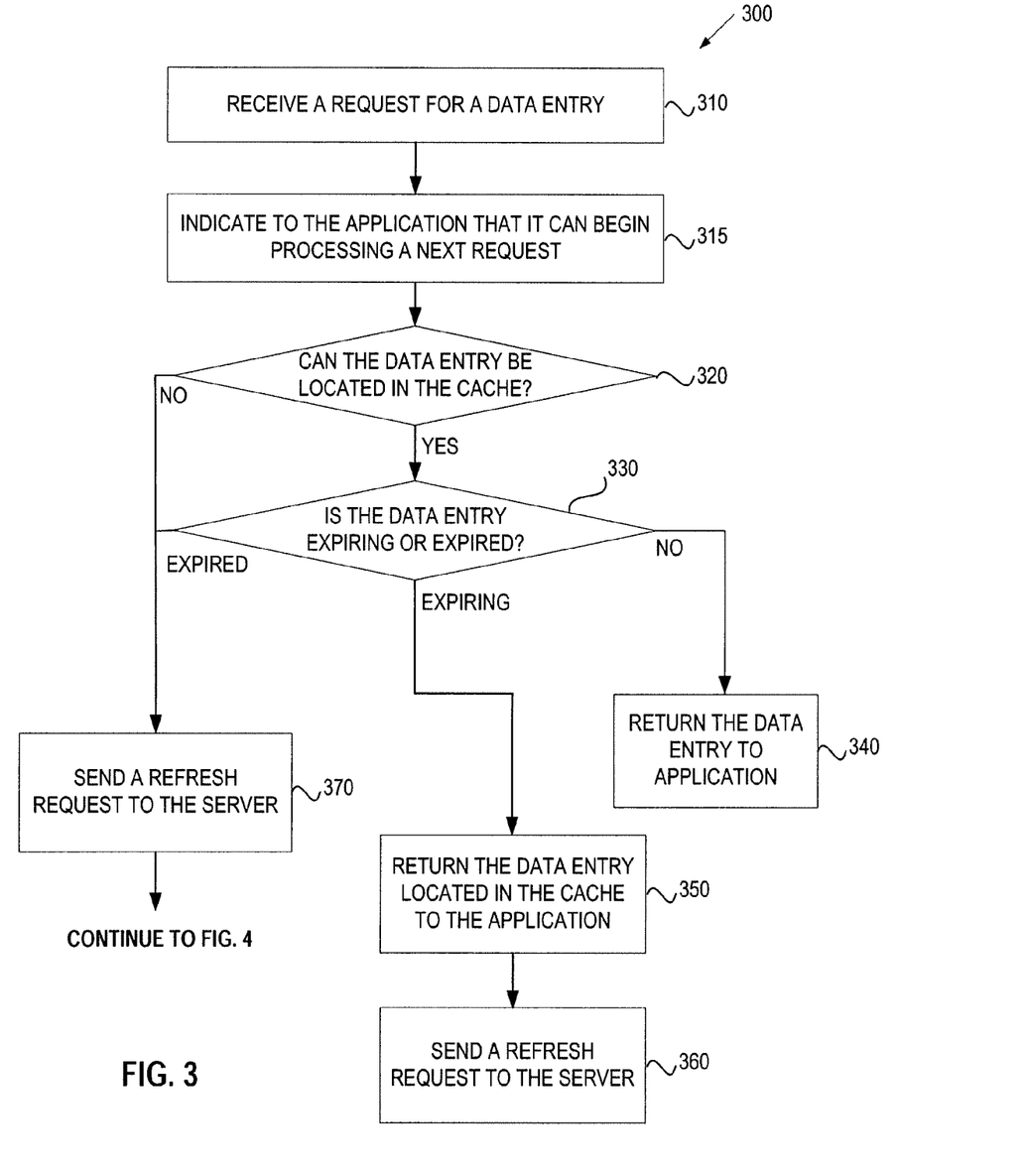
FIG. 3 is a flow diagram of one embodiment of a method for refreshing a cached data entry before the data entry is expired.

FIG. 3 is a flow diagram illustrating one embodiment of a method 300 for refreshing a cached data entry before the data entry is expired. The method 300 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 300 is performed by the data manager 107 in the client 101 of FIG. 2.

Referring to FIG. 3, in one embodiment, the method 300 begins when the data manager 107 receives a request for a data entry (block 310). The request may come from an application (a "requesting application") that accepts data access requests from a user. For example, the requesting application can be a Web server application that accepts a user's request to access a Web page, and sends an authentication request to an authentication daemon to authenticate the user's identity. In this example, the data manager 107 is the authentication daemon and the cached data entry contains the user's identity information. The data manger 107 also indicates to the requesting application that the requesting application can begin processing a next request (block 315). That is, the requesting application is designed to not expect a result immediately. The result will be returned to the requesting application asynchronously, regardless whether the requested data entry will be found in the cache 105.

In response to the request, the data manager 107 determines whether the data entry can be located in the cache 105 (block 320). If the data entry can be located in the cache 105, the data manager 107 determines whether the data entry is expiring or expired (block 330). If the data entry is neither expiring nor expired, the data manager 107 retrieves the data entry found in the cache 105 and returns the data entry to the requesting application (block 340). If, at block 330, the data entry is expiring, which means the data entry has not been refreshed for a time period greater than the refresh timeout 206, the data manager 107 retrieves the data entry found in the cache 105 and returns the data entry to the requesting application (block 350). The data manager 107 also sends a refresh request to the server 108 (block 360). The refresh request can be sent before, at the same time, or after the retrieval and return of the data entry at block 350. The data entry found in the cache 105 is immediately returned to the requesting application without waiting for the refresh request to be sent or the cache refresh is completed. The data entry in the cache 105 can be refreshed, at a later time, by the data manager 107 using the data retrieved from the server 108. Thus, the data entry can be refreshed asynchronously with the retrieval of the cached data entry and return of the entry to the requesting application.

If the data entry cannot be found in the cache 105 (block 320), or if the data entry in the cache 105 is expired (block 330), the data manager 107 sends a refresh request to the server (block 370). In this scenario, the method 300 continues to process a response to the refresh request, which is described in connection with FIG. 4.

Figure 4:
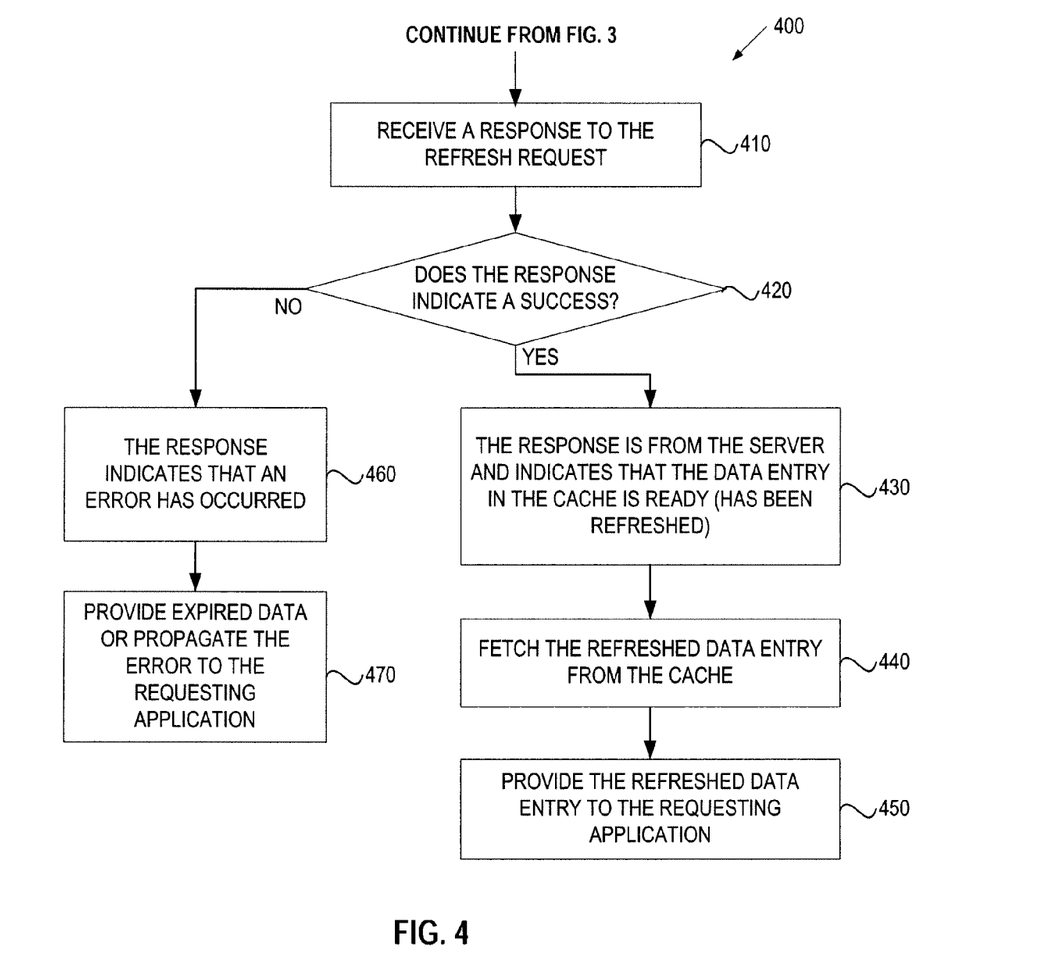
FIG. 4 is a flow diagram of one embodiment of a method for a client to request data from a server to refresh a data entry in a cache.

FIG. 4 is a flow diagram illustrating one embodiment of a method 400 for processing a response to a refresh request, where the refresh request is sent from the client 101 to the server 108. The refresh request is sent when a data entry cannot be found in the cache 105 or when the data entry in the cache 105 is expired. The method 400 may be performed by processing logic 526 of FIG. 5 that may comprise hardware (e.g., circuitry, dedicated logic, programmable logic, microcode, etc.), software (e.g., instructions run on a processing device to perform hardware simulation), or a combination thereof. In one embodiment, the method 400 is performed by the data manager 107 in the client 101 of FIG. 2.

Referring to FIG. 4, in one embodiment, the method 400 begins when the data manager 107 receives a response to the refresh request that was sent at block 370 of FIG. 3 (block 410). The response may indicate a success or a failure of the refresh request (block 420). The response indicates a success if the response is sent from the server 108 and indicates that the data entry in the cache 105 has been successfully refreshed and is ready to be used (block 430). The data manager 107 then fetches the data entry from the cache 105 (block 440), and provides the refreshed data entry to the requesting application (block 450). Operation at block 450 is the same as the operation at blocks 340 and 350, as described above.

At block 420, the response may indicate a failure if the response is an error message (block 460). A failure can occur in a number of scenarios. For example, an error message can be returned immediately if the client 101 has not been installed with a data provider or the connection to the data provider is broken. An error message can also be returned when there is no connection with the server 108 or the server 108 is not responding within a configurable amount of time. Upon receiving an error message, the data manager 107 provides the expired data entry to the requesting application (if the expired data entry is available in the cache 105) or propagates the error message to the requesting application (block 470). In one embodiment, the data manager 107 may return the expired data if and only if the error response indicates that the server 108 was unreachable, and then only if the system is configured to permit access to an expired data entry. Allowing an expired cache entry access can be a security vulnerability. On the other hand, if the error indicates that the entry no longer exists (or never existed) on the server 108, then the error can be propagated to the requesting application.

As mentioned above, the method 400 of FIG. 4 can be performed following a refresh request at block 370 (i.e., when a data entry cannot be found in the cache 105 or when the data entry in the cache 105 is expired). In the case where a refresh request is sent to the server 108 when the data entry is found to be expiring (block 360), the method 400 can also be performed except that there is no need to signal the requesting application. This is because a result has been returned to the requesting application and the cache is refreshed against future requests. Thus, with an out-of-band update (in response to the refreshed request at block 360 when the data entry is expiring), the operation at blocks 440 and 450 can be omitted.

The following example describes an on-line scenario where the refresh timeout is 150 seconds and the expiration timeout is 300 seconds. First, a user sends an authentication request for the first time. The request incurs a cache miss, the worst possible performance in terms of data access time. In this example, the data manager 107 is an authentication daemon, which communicates with the server over the network, gets the data entry and adds the data entry to the local cache along with a refresh timeout value (150 seconds) and an expiration timeout value (300 seconds). Then the cached data entry is returned to the user.

Subsequently, the user makes a second authentication request for the same resource 60 seconds later. The requested data entry is found in the cache and a response is immediately returned by the cache. This request incurs a cache-hit, which is the fastest performance scenario.

Next, the user makes a third authentication request for the resource 95 seconds after the second request (a total of 155 seconds). At this time, the refresh timeout (150 seconds) of the data entry has been passed, but not the expiration timeout (300 seconds). The cached value is immediately returned to the user as with a standard cache-hit for maximum performance. After the transaction with the user is complete, a cache refresh request is added to a queue of cache refresh requests, waiting to be delivered to the server at an appropriate time that is asynchronous with the transaction with the user.

Finally, the user makes a fourth authentication request for the same resource ten minutes later. Ten minutes is beyond the cache expiration timeout. Thus, this request can be treated as a cache miss, as in the first request. The cache is refreshed from the server and the refreshed result is returned to the client.

With the cache refresh approach described above, the number of cache hits can be maximized while fresh data can still be maintained in the cache. For very high-traffic requests (e.g., dozens of requests per minute or more), this approach can translate to limited refresh requests in a few minutes (two requests within five minutes in this example), and hundreds of cache-hit replies. If a user makes requests less often than the expiration timeout, the approach described herein incurs no additional cache-misses than the conventional approach.

Figure 5:
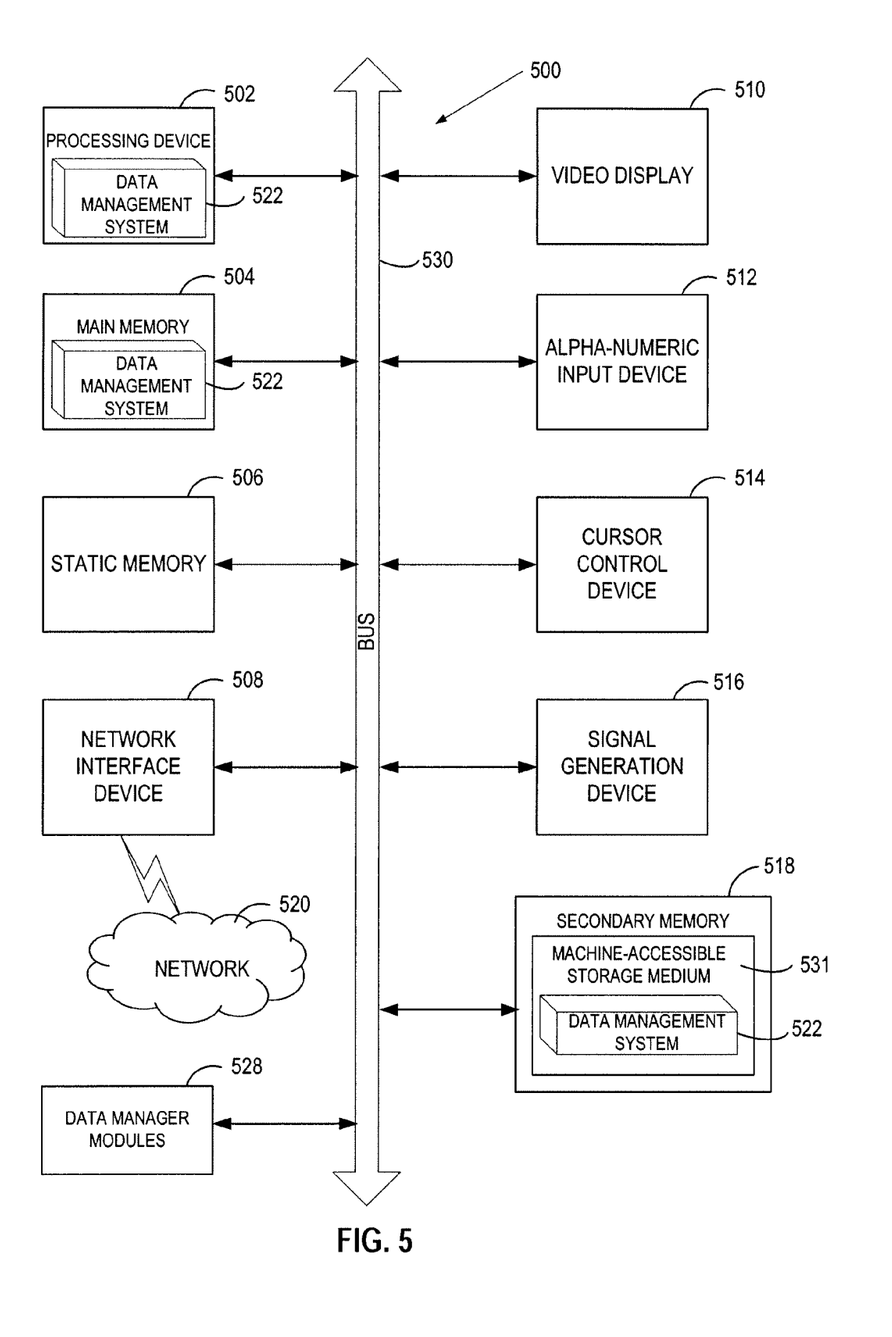
FIG. 5 illustrates a diagrammatic representation of a machine in the exemplary form of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., a data management system 522) embodying any one or more of the methodologies or functions described herein (e.g., the data manager 107 of FIGS. 1 and 2). The data management system 522 may also reside, completely or at least partially, within the main memory 504 and/or within the processing device 502 during execution thereof by the computer system 500; the main memory 504 and the processing device 502 also constituting machine-readable storage media. The data management system 522 may further be transmitted or received over a network 520 via the network interface device 508.

The machine-readable storage medium 531 may also be used to store the data management system 522 persistently. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that cause the machine to perform any one or more of the methodologies of the present invention. The term "machine-readable storage medium" shall accordingly be taken to include, but not be limited to, solid-state memories, and optical and magnetic media.

The computer system 500 may additionally include data management modules 528 for implementing the functionalities of the data manager 107 of FIGS. 1 and 2. The modules 528, components and other features described herein (for example in relation to FIG. 1) can be implemented as discrete hardware components or integrated in the functionality of hardware components such as ASICS, FPGAs, DSPs or similar devices. In addition, the modules 528 can be implemented as firmware or functional circuitry within hardware devices. Further, the modules 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "locating", "indicating", "returning", "requesting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relates to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of non-transitory media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    locating, by a computing system, a data entry in a cache in response to a first request to access the data entry, wherein the cache has an expiration timeout that, when exceeded by an amount of time since a last update of a particular data entry, indicates that the particular data entry is to be updated before being provided, and wherein the cache has a refresh timeout that is shorter than the expiration timeout, and wherein when an amount of time since a last update of a particular data entry exceeds the refresh timeout but does not exceed the expiration timeout, the particular data entry can be provided once before being updated;
    receiving by the computing system, at a particular time that occurs after the first request, a second request to access the data entry, wherein a difference between the particular time and a time at which the data entry was last updated exceeds the refresh timeout but does not exceed the expiration timeout;
    in response to the second request, providing the data entry and transmitting a refresh request to refresh the data entry;
    receiving by the computing system, after the transmitting of the refresh request but before the data entry has been refreshed, a third request to access the data entry; and
    in response to the third request, providing the data entry after the data entry has been refreshed.

2. The method of claim 1, wherein the computing system comprises a Web server.

3. The method of claim 1, further comprising:
    Indicating to an application that submits a request to access the data entry that the application can begin processing a next request without causing blocking of the next request.

4. The method of claim 1, further comprising:
    in response to a determination that the data entry is not in the cache or is expired since the last update, retrieving data from a server to update the data entry in the cache.

5. The method of claim 4, wherein the server is one of a Lightweight Directory Access Protocol (LDAP) server, an NIS server, an NIS+ server, or an SQL database server.

6. The method of claim 1, further comprising:
    queuing one of a plurality of refresh requests of a data entry; and
    attaching information to the queued refresh request to indicate which requesting applications are requesting the data entry.

7. A non-transitory computer readable storage medium including instructions that, when executed by a computing system, cause the computing system to perform operations comprising:
    locating, by the computing system, a data entry in a cache in response to a first request to access the data entry, wherein the cache has an expiration timeout that, when exceeded by an amount of time since a last update of a particular data entry, indicates that the particular data entry is to be updated before being provided, and wherein the cache has a refresh timeout that is shorter than the expiration timeout, and wherein when an amount of time since a last update of a particular data entry exceeds the refresh timeout but does not exceed the expiration timeout, the particular data entry can be provided once before being updated;
    receiving by the computing system, at a particular time that occurs after the first request, a second request to access the data entry, wherein a difference between the particular time and a time at which the data entry was last updated exceeds the refresh timeout but does not exceed the expiration timeout;
    in response to the second request, providing the data entry and transmitting a refresh request to refresh the data entry;
    receiving by the computing system, after the transmitting of the refresh request but before the data entry has been refreshed, a third request to access the data entry; and
    in response to the third request, providing the data entry after the data entry has been refreshed.

8. The non-transitory computer readable storage medium of claim 7, wherein the cache is locally coupled to the computing system.

9. The non-transitory computer readable storage medium of claim 7, wherein the operations further comprise:
    Indicating to an application that submits a request to access the data entry that the application can begin processing a next request without causing blocking of the next request.

10. The non-transitory computer readable storage medium of claim 7, wherein the operations further comprise:
    in response to a determination that the data entry is not in the cache or is expired since the last update, retrieving data from a server to update the data entry in the cache.

11. The non-transitory computer readable storage medium of claim 10, wherein the server is one of a Lightweight Directory Access Protocol (LDAP) server, an NIS server, an NIS+ server, or an SQL database server.

12. The non-transitory computer readable storage medium of claim 7, wherein the operations further comprise:
    queuing only one of a plurality of refresh requests of a data entry; and
    attaching information to the queued refresh request to indicate which requesting applications are requesting the data entry.

13. A system comprising:
    a network interface device; and
    a processor to:
        receive, via the network interface device, a first request to access a data entry in a cache, wherein the cache has an expiration timeout that, when exceeded by an amount of time since a last update of a particular data entry, indicates that the particular data entry is to be updated before being provided, and wherein the cache has a refresh timeout that is shorter than the expiration timeout, and wherein when an amount of time since a last update of a particular data entry exceeds the refresh timeout but does not exceed the expiration timeout, the particular data entry can be provided once before being updated, locate the data entry in the cache, receive via the network interface device, at a particular time that occurs after the first request, a second request to access the data entry, wherein a difference between the particular time and a time at which the data entry was last updated exceeds the refresh timeout but does not exceed the expiration timeout, in response to the second request, provide the data entry and transmit a refresh request to refresh the data entry, receive via the network interface device, after the transmitting of the refresh request but before the data entry has been refreshed, a third request to access the data entry, and in response to the third request, provide the data entry after the data entry has been refreshed.

14. The system of claim 13 further comprising the cache.

15. The system of claim 13, wherein the processor is also to retrieve data from a server to update the data entry in the cache, and wherein the server is one of a Lightweight Directory Access Protocol (LDAP) server, an NIS server, an NIS+ server, or an SQL database server.

16. The system of claim 13, further comprising:
 a queue to enqueue one of a plurality of refresh requests of a data entry.

17. The system of claim 13, wherein the refresh timeout has a first value for a first category of data entries, and a second value for a second category of data entries.

* * * * *